United States Patent
Ju et al.

(10) Patent No.: US 10,614,336 B2
(45) Date of Patent: Apr. 7, 2020

(54) METHOD, SYSTEM, AND COMPUTER-READABLE RECORDING MEDIUM FOR IMAGE-BASED OBJECT TRACKING

(71) Applicant: Wistron Corporation, New Taipei (TW)

(72) Inventors: Ting-Feng Ju, New Taipei (TW); Kuo-Hsien Lu, New Taipei (TW); Bo-Yi Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 96 days.

(21) Appl. No.: 15/919,171

(22) Filed: Mar. 12, 2018

(65) Prior Publication Data
US 2019/0156138 A1    May 23, 2019

(30) Foreign Application Priority Data
Nov. 20, 2017   (TW) .............................. 106140051 A

(51) Int. Cl.
*G06K 9/00*  (2006.01)
*G06K 9/32*  (2006.01)
(Continued)

(52) U.S. Cl.
CPC ....... *G06K 9/3241* (2013.01); *G06K 9/00758* (2013.01); *G06K 9/46* (2013.01); *G06K 9/80* (2013.01)

(58) Field of Classification Search
None
See application file for complete search history.

(56) References Cited

U.S. PATENT DOCUMENTS

| 7,142,600 B1 * | 11/2006 | Schonfeld | H04N 19/51 375/240.16 |
| 2013/0208943 A1 * | 8/2013 | Chuang | G06T 7/246 382/103 |

(Continued)

FOREIGN PATENT DOCUMENTS

| TW | 200834435 | 8/2008 |
| TW | 201331854 | 8/2013 |

OTHER PUBLICATIONS

Dolado et al., "A method for resolving occlusions when multitracking individuals in a shoal", Behav Res (2015) 1032-1043 (Year: 2015).*

(Continued)

*Primary Examiner* — Soo Jin Park
(74) *Attorney, Agent, or Firm* — JCIPRNET

(57) ABSTRACT

A method, a system, and a computer-readable recording medium for image-based object tracking are provided. The method includes following steps. A video stream including a plurality of images is received. The video stream is generated through photographing an enclosed space by an image capturing device, and a moving range of a plurality of observed objects is limited to the enclosed space. A plurality of moving objects are detected from the video stream, and frames associated with each of the moving objects are generated for the images. The images include a current image and a previous image. By analyzing position projecting relationship between current frames in the current image and previous frames in the previous image, linking relationship between the current frames in the current image and the observed objects is established. The observed objects in the enclosed space are tracked according to the established linking relationship.

19 Claims, 10 Drawing Sheets

(51) Int. Cl.
*G06K 9/46* (2006.01)
*G06K 9/80* (2006.01)

(56) References Cited

U.S. PATENT DOCUMENTS

2017/0290306 A1* 10/2017 Akitomi .................. G06M 7/00
2018/0263223 A1* 9/2018 Kodaira .................. G06M 7/00

OTHER PUBLICATIONS

Pinkiewicz et al., "Application of the particle filter to tracking of fish in aquaculture research", 2008 Digital Image Computing: Techniques and Applications (Year: 2008).*
Xia et al., "Posture tracking of multiple individual fish for behavioral monitoring with visual sensors", Ecological Informatics 36 (2016) 190-198 (Year: 2016).*
Fukunaga et al., "GroupTracker: video tracking system for multiple animals under severe occlusion", Computational Biology and Chemistry 57 (2015) 39-45 (Year: 2015).*
Terayama et al., "Appearance-based multiple fish tracking for collective motion analysis", 2015 3rd IAPR Asian Conference on Pattern Recognition (Year: 2015).*
Qian et al., "Automatically detect and track multiple fish swimming in shallow water with frequent occlusion", PLoS One 9(9): e106506, 2014 (Year: 2014).*
Kato et al., "A computer image processing system for quantification of zebrafish behavior", Journal of Neuroscience Methods 134 (2004) 1-7 (Year: 2004).*
"Office Action of Taiwan Counterpart Application," dated Mar. 9, 2018, p. 1-p. 7.

* cited by examiner

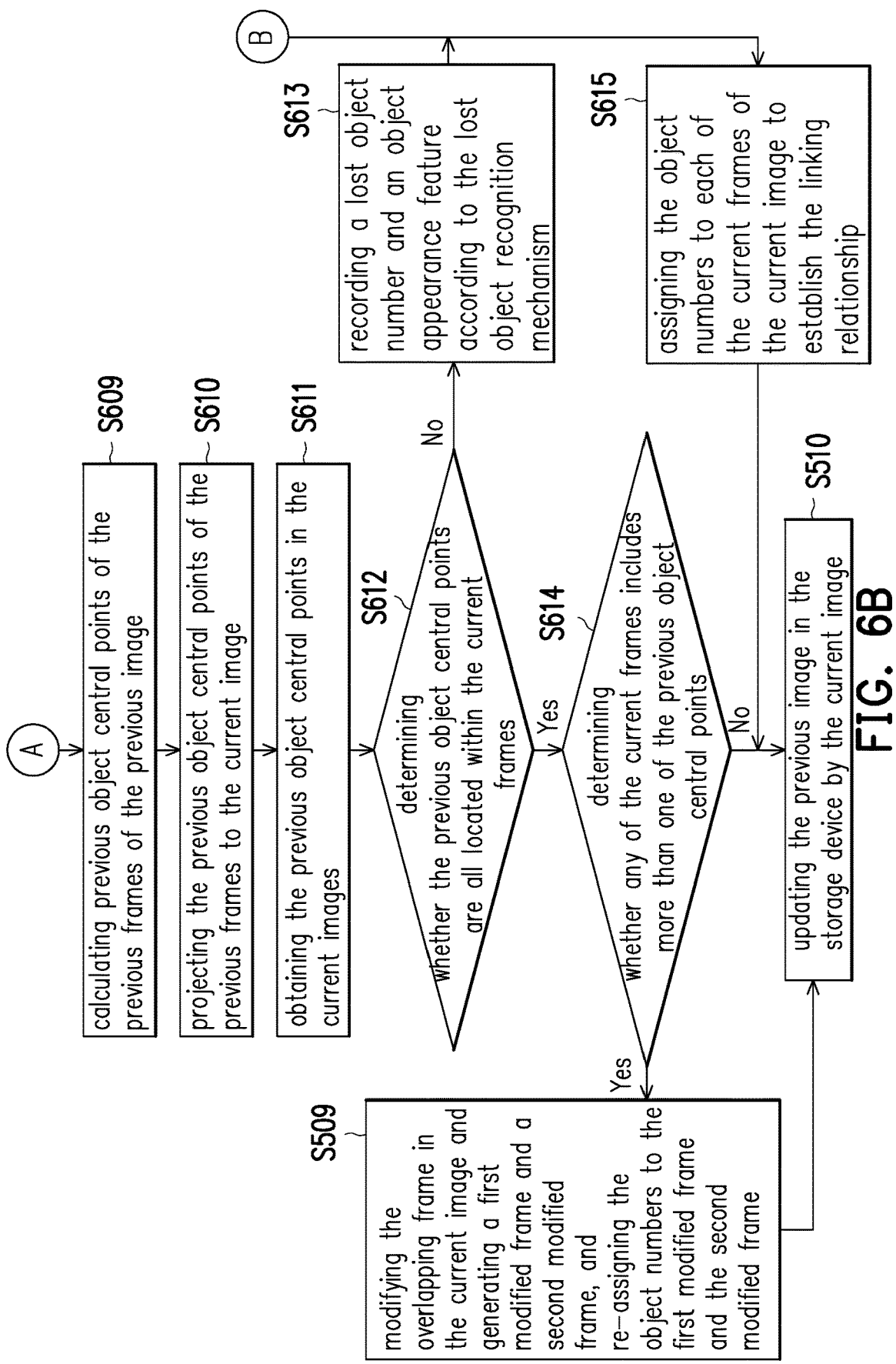

METHOD, SYSTEM, AND COMPUTER-READABLE RECORDING MEDIUM FOR IMAGE-BASED OBJECT TRACKING

CROSS-REFERENCE TO RELATED APPLICATION

This application claims the priority benefit of Taiwan application serial no. 106140051, filed on Nov. 20, 2017. The entirety of the above-mentioned patent application is hereby incorporated by reference herein and made a part of this specification.

BACKGROUND

Technical Field

The disclosure relates to a technique of detecting moving objects, and in particular, to an image-based object tracking method, a system and a computer-readable recording medium thereof.

Description of Related Art

As technology advances, visual monitoring apparatuses have been developed to exhibit great application potentials, and video image detection techniques have been widely applied to various applications for recognizing and tracking moving objects. Specifically, tracking algorithms based on image processing are indispensable core techniques in visual monitoring systems. By using tracking algorithms based on image processing, a visual monitoring system can analyze video images to track positions and movement statuses of tracked objects in a monitor environment.

However, in different monitor environments and scenarios, properties, forms, and moving tendencies of the tracked object as well as types of the monitor environment are all different. Therefore, an algorithm designer generally designs a suitable algorithm process according to the monitor environment and scenario to detect and track objects accurately and efficiently. Most of the object tracking algorithms are adopted to detect and track people or object, such as vehicles, in an opening space. The open space indicates that the tracked objects may enter or go out of the monitored space, and the number of the tracked objects in the open space is not fixed. Therefore, the tracking algorithms for an open space generally focus on monitoring moving trends of the tracked objects, whether the tracked objects repetitively appear, or whether the tracked objects enter a prohibited area. However, a complete process for accurately tracking the tracked objects in an enclosed space is seldom discussed. Moreover, how to improve tracking accuracy for tracked objects having greater formal changes is also one of the issues that attract attention from people skilled in the art.

SUMMARY

The embodiments of the disclosure provide an image-based object tracking method and a system and a computer-readable recording medium thereof that accurately and efficiently track moving objects having greater formal changes in an enclosed space by analyzing a video stream of the enclosed space.

In an embodiment of the disclosure, the image-based object tracking method is suitable for an object tracking system, and the method includes steps below. A video stream including a plurality of images is received. Here, the video stream is generated through photographing an enclosed space by an image capturing device, and a moving range of a plurality of observed objects is limited to the enclosed space. Then, a plurality of moving objects are detected from the video stream, and frames associated with each of the moving objects are generated for the images. The images include a current image and a previous image. By analyzing position projecting relationship between current frames in the current image and previous frames in the previous image, linking relationship between the current frames in the current image and the observed objects is established. Afterwards, the observed objects in the enclosed space are tracked according to the established linking relationship.

In an embodiment of the disclosure, the image-based object tracking system includes an image capturing device, a storage device, and a processor, wherein the processor is coupled to the image capturing device and the storage device. The image capturing device is configured to photograph an enclosed space and generate a video stream, wherein a moving range of a plurality of observed objects is limited to the enclosed space. The storage device is configured to store data, and the processor is configured to execute steps below. A video stream including a plurality of images is received. A plurality of moving objects are detected from the video stream, and frames associated with each of the moving objects are generated for the images. The images include a current image and a previous image. By analyzing position projecting relationship between current frames in the current image and previous frames in the previous image, linking relationship between the current frames in the current image and the observed objects is established. Afterwards, the observed objects in the enclosed space are tracked according to the established linking relationship and the frames.

In an embodiment of the disclosure, the non-transitory computer-readable recording medium records computer programs to be loaded into the processor of the image-based object tracking system to execute the steps of the foregoing image-based object tracking method.

Accordingly, through analyzing the correspondence between frames of continuous images over time, the embodiments of the disclosure provide an object tracking method having specificity and high accuracy.

To provide a further understanding of the aforementioned and other features and advantages of the disclosure, exemplary embodiments, together with the reference drawings, are described in detail below.

BRIEF DESCRIPTION OF THE DRAWINGS

FIG. 6A and FIG. 6B are flowcharts illustrating establishing linking relationship between frames in the current image and observed objects according to an embodiment of the disclosure.

DESCRIPTION OF THE EMBODIMENTS

Figure 1:
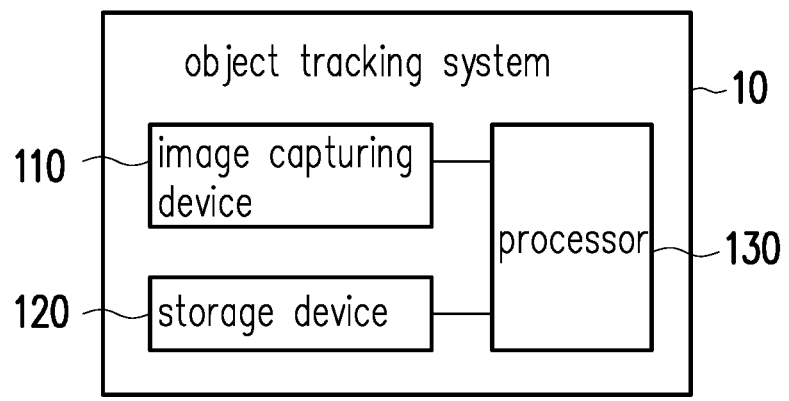
FIG. 1 is a block diagram illustrating an image-based object tracking system according to an embodiment of the disclosure.

Some embodiments of the disclosure will next be detailed with reference to the accompanying drawings. The reference numerals used in the description below will be seen as referring to the same or similar components when the same reference numerals appear in different drawings. The embodiments only form part of the disclosure and do not disclose all of the embodiments that can be implemented by the disclosure. More specifically, the embodiments are only examples of a method, a system, and a non-transitory computer-readable recording medium for image-based object tracking in the claims of the disclosure.

FIG. 1 is a block diagram illustrating an image-based object tracking system according to an embodiment of the disclosure, which, however, is merely meant to facilitate illustration and is not meant to limit the disclosure. First, FIG. 1 introduces all components in an object tracking system and their configuration relations. Their detailed functions and operations will be disclosed with reference to FIG. 2 and FIG. 3.

Referring to FIG. 1, an image-based object tracking system 10 includes an image capturing device 110, a storage device 120, and a processor 130, wherein the processor 130 is coupled to the image capturing device 110 and the storage device 120. In an embodiment, the image-based object tracking system 10 includes a computer system including the storage device 120 and the processor 130, and the image capturing device 110 externally connected to the computer system. For example, the image-based object tracking system 10 may be constituted by a laptop (or a desktop) computer and an external video camera, but the disclosure is not limited hereto. In another embodiment, the image-based object tracking system 10 integrates the image capturing device 110, the storage device 120, and the processor 130 in one single electronic device. For example, the image-based object tracking system 10 may be an electronic device having an image capturing function, such as a smartphone, a tablet computer, etc., but the disclosure is not limited hereto.

The image capturing device 110 is configured to capture images of an enclosed space to generate a video stream and includes an imaging lens having a lens and a photosensitive device. The photosensitive device is configured to sense intensity of light entering the lens so as to generate an image. The photosensitive device is, for example, a charge coupled device (CCD), a complementary metal-oxide semiconductor (CMOS) device, or another device, and the disclosure is not limited hereto.

The storage device 120 is configured to store data such as images and program codes, and is, for example, a fixed or movable random access memory (RAM), read-only memory (ROM), flash memory, hard disc of any form, or another similar device, an integrated circuit, or a combination thereof.

The processor 130 is configured to control actuations between the components of the image-based object tracking system 10, and the processor 130 is, for example, a central processing unit (CPU) or another programmable general-purpose or specific-purpose microprocessor, digital signal processor (DSP), programmable controller, application specific integrated circuit (ASIC), programmable logic device (PLD), another similar device, or a combination of these devices.

It is noted that, in the embodiments of the disclosure, a space to be monitored by a watcher is an enclosed space, and a plurality of observed objects can freely move in the enclosed space. Moreover, a moving range of the observed objects is limited to the enclosed space. In other words, in the embodiments of the disclosure, a monitor scenario is mainly set to involve monitoring and tracking a fixed number of the observed objects in the enclosed space. Without intervention by an external force, the number of the observed objects in the enclosed space may not be changed. The image-based object tracking system 10 photographs the enclosed space through the image capturing device 110 and tracks the observed objects in the enclosed space through image processing techniques and the object tracking method of the disclosure.

Figure 2:
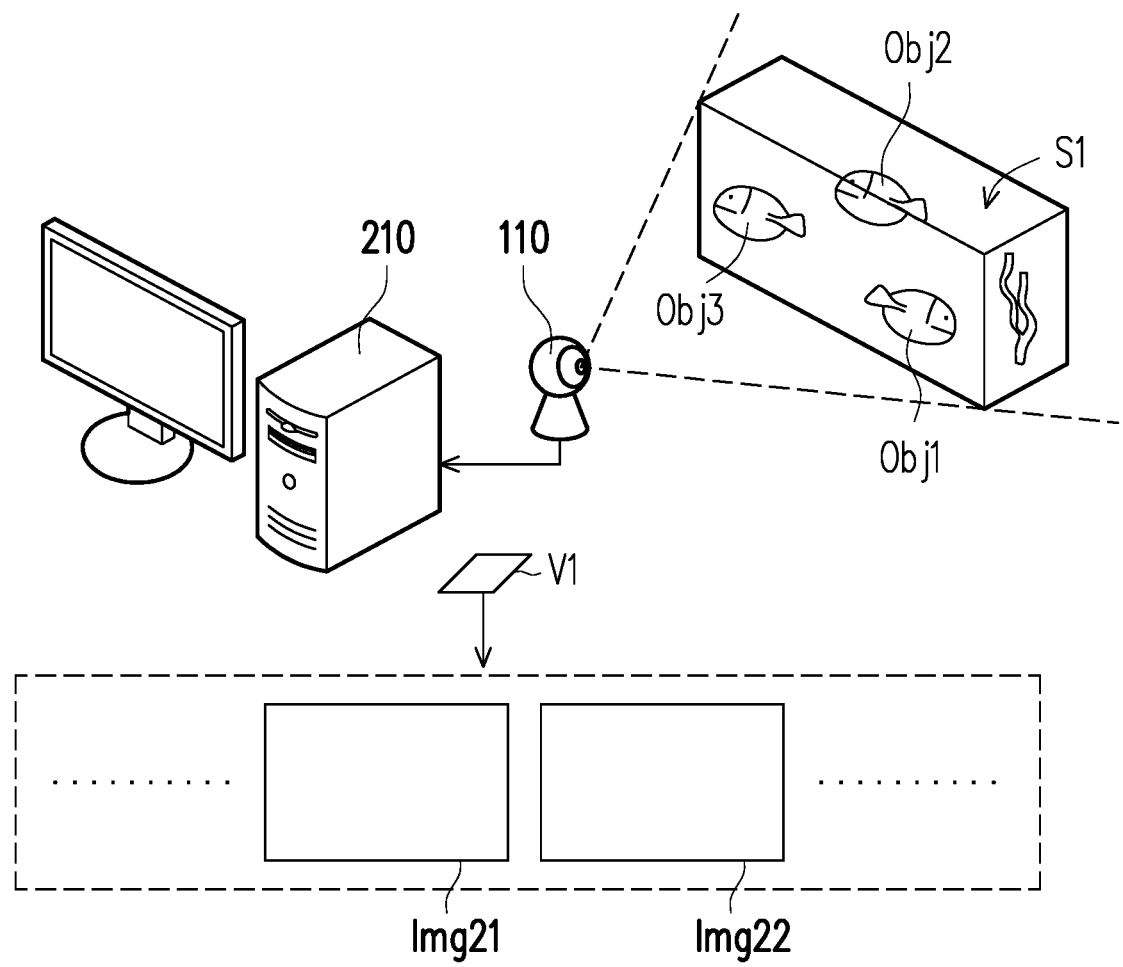
FIG. 2 is a situational schematic diagram illustrating an image-based object tracking system according to an embodiment of the disclosure.

For example, FIG. 2 is a situational schematic diagram illustrating an image-based object tracking system according to an embodiment of the disclosure. In the example of FIG. 2, a monitored enclosed space S1 is an internal space of an aquarium, and observed objects Obj1 to Obj3 to be tracked are fish kept in the aquarium. The image capturing device 110 is installed at a fixed position and constantly photographs the aquarium to generate a video stream V1. The image capturing device 110 provides the video stream V1 to a computer system 210 constituted by the processor 130 and the storage device 120. The video stream V1 includes a plurality of images, e.g., an image Img21 and an image Img22, respectively corresponding to different time points. Therefore, in the embodiments of the disclosure, by analyzing the video stream V1, movement statuses and positions of the fish (i.e., the observed objects Obj1 to Obj3) in the aquarium can be tracked. To facilitate comprehension, the example of FIG. 2 and the embodiments below will be illustrated mainly with fish in an aquarium as the observed objects, but the disclosure is not limited hereto. In other embodiments, the observed objects may also be live creatures of other species, and the enclosed space may be a space that limits a moving range of the live creatures.

Figure 3:
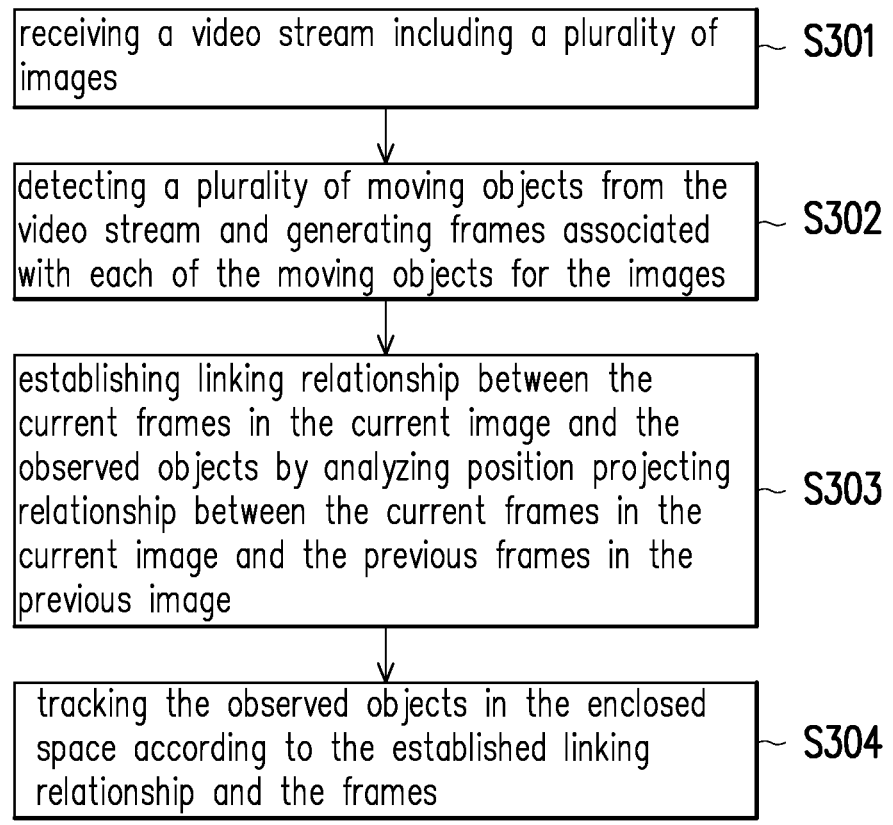
FIG. 3 is a flowchart illustrating an image-based object tracking method according to an embodiment of the disclosure.

Embodiments will be provided below with reference to the components of the image-based object tracking system 10 of FIG. 1 to describe detailed steps of the object tracking method executed by the image-based object tracking system 10. FIG. 3 is a flowchart illustrating an image-based object tracking method according to an embodiment of the disclosure. Please refer to FIG. 1 and FIG. 3 at the same time.

First, in step S301, the processor 130 receives a video stream including a plurality of images. The video stream is generated through photographing an enclosed space by the image capturing device 110, and a moving range of a plurality of observed objects is limited to the enclosed space. In step S302, the processor 130 detects a plurality of moving objects from the video stream and generates frames associated with each of the moving objects for the images.

Specifically, the processor 130 detects a moving region based on differences in pixel values between consecutive images in the video stream to detect the moving objects that are moving. For example, through background subtraction, the processor 130 defines information that does not change over time (i.e., information that does not move) in the images as a background, and subtracts a current image by a previous image to obtain information of the dynamic moving objects. Moreover, the processor 130 further performs image processing including, for example, binarization, blurring, erosion, and noise reduction to complete detection of the moving objects.

Then, after detecting the moving objects in the current image, the processor 130 defines frames (generally referred to as regions of interest (ROI)) respectively of the moving objects. The frames respectively correspond to each of the moving objects, and sizes of the frames are at least sufficient to enclose the corresponding moving objects. In the video stream, with the exception of the first-in image in which the moving objects cannot be detected and the frames cannot be defined, the moving objects can be detected and the frames associated with the moving objects can be generated in the rest of the images based on the description above.

Figure 4:
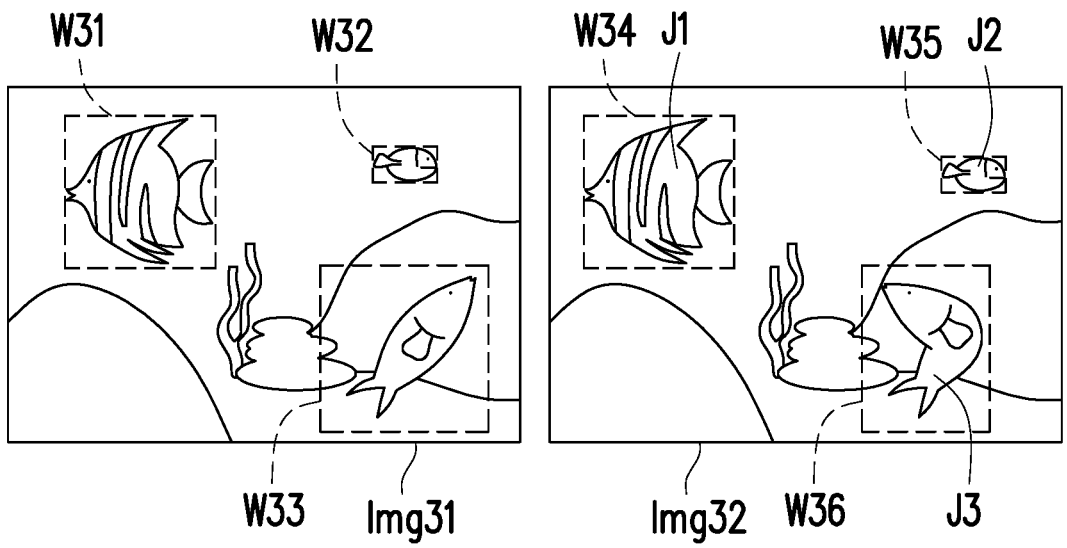
FIG. 4 illustrates examples of a current image and a previous image according to an embodiment of the disclosure.

Taking a previous image Img31 and a current image Img32 illustrated in FIG. 4 according to an embodiment of the disclosure as an example, the previous image Img31 and the current image Img32 are taken from the same video stream but are consecutive images of different time points, and the current image Img32 is the image on which the processor 130 is currently performing image analysis. When the processor 130 performs detection of the moving objects on the current image Img32, the processor 130 detects moving objects J1, J2, J3 in the current image based on pixel differences between the previous image Img31 and the current image Img32. Next, the processor 130 generates current frames W34, W35, W36 respectively corresponding to the moving objects J1, J2, J3. Similarly, with respect to the previous image Img31, the processor 130 uses another image previous to the previous image Img31 to generate previous frames W31, W32, W33 corresponding to each of the moving objects by the same processing method. In other words, with the exception of the first-in image of the video stream, the processor 130 detects the moving objects and encloses the corresponding frames for the rest of the images in the video stream. As an example, the frames in FIG. 4 are rectangular, but the disclosure is not limited hereto. In other embodiments, the frames may also be circular, elliptical, pentagonal, hexagonal, or may be in another shape. However, to facilitate illustration, the example of the rectangular frames will be used in the description of the embodiments below.

Referring back to the flowchart in FIG. 3, in step S303, by analyzing position projecting relationship between the current frames in the current image and the previous frames in the previous image, the processor 130 establishes linking relationship between the current frames in the current image and the observed objects. Specifically, since the frames are generated through detecting the moving objects in the images, the frames basically respectively correspond to the photographed observed objects. In the embodiments of the disclosure, the processor 130 first analyzes the position projecting relationship between the current frames in the current image and the previous frames in the previous image to obtain association between two frames corresponding to the same observed object on two consecutive images. The association between two frames of two consecutive images is established on the basis of whether they correspond to the same observed object. Based on the association between two frames corresponding to the same observed object on different images (i.e., the previous image and the current image), the linking relationship between the current frames in the current image and the observed objects is established.

In other words, the processor 130 first analyzes the position projecting relationship between the current frames in the current image and the previous frames in the previous image to link the current frames respectively to the corresponding observed objects according to the linking relationship between the previous frames and the observed objects. In an embodiment, the linking relationship between the current frames in the current image and the observed objects is established based on object numbers, and the linking relationship indicates that the observed objects and the frames correspond to the same object numbers. In other words, by assigning object numbers to the current frames of the current image according to the association between the current frames of the current image and the previous frames of the previous image, the inking relationship between the current frames of the current image and the observed objects is established.

Finally, in step S304, the processor 130 tracks the observed objects in the enclosed space according to the established linking relationship and the frames. Specifically, since the linking relationship between the frames and the observed objects is available, the movement statuses and positions of the observed objects can be estimated by analyzing frame positions on the images, such that the watcher can monitor and track the observed objects. It is noted that since the tracking method in the present embodiment has specificity, after the linking relationship between the frames and the observed objects is established, individual information fields of the observed objects may be added to the image of the video stream according to the linking relationship and the positions of the frames. Therefore, when the watcher views the processed video, the information fields of the observed objects in the image constantly follow the observed objects in the image.

Figure 5:
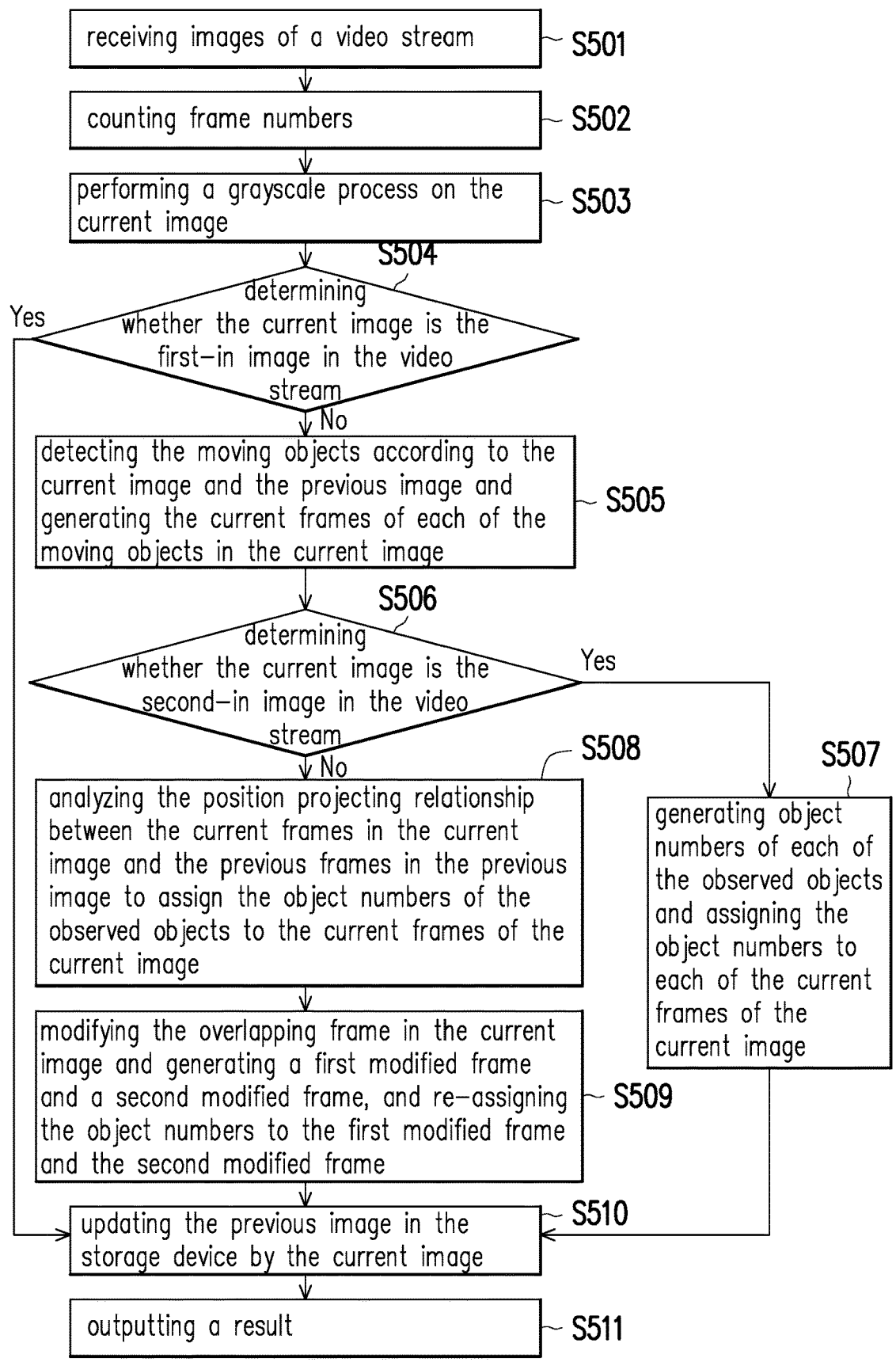
FIG. 5 is a flowchart illustrating an image-based object tracking method according to an embodiment of the disclosure.

To more clearly illustrate the establishment of the linking relationship between the frames of the current image and the observed objects, embodiments will be provided below with reference to the components of the image-based object tracking system 10 of FIG. 1 to describe detailed steps of the object tracking method executed by the image-based object tracking system 10. FIG. 5 is a flowchart illustrating an image-based object tracking method according to an embodiment of the disclosure.

In step S501, the processor 130 receives images of a video stream recorded by the image capturing device 110. In step S502, the processor 130 counts frame numbers. Specifically, the video stream includes a plurality of images having frame numbers, and the images are sequentially numbered according to a sequence when they are recorded. By counting the frame numbers of the images, the processor 130 recognizes whether the current image, which is currently being analyzed, is a first-in image or a second-in image in the video stream. In step S503, the processor 130 performs a grayscale process on the current image to obtain a grayscale image of the current image.

In step S504, the processor 130 determines whether the current image is the first-in image in the video stream. If the processor 130 determines the current image is the first-in image in the video stream, it means that the processor 130 has so far received only one single image and is unable to detect moving objects. Accordingly, in step S510, the processor 130 updates the previous image in the storage device as the current image, namely, storing the first-in image as the previous image.

If the processor 130 determines the current image is not the first-in image in the video stream, in step S505, the processor 130 detects the moving objects according to the current image and the previous image, and generates the current frames of each of the moving objects in the current image. The processor 130 detects the moving objects and generates the current frames according to the image processing below, for example: image subtraction processing-→binarization processing→blurring processing→binarization processing→ROI defining processing. Then, in step S506, the processor 130 determines whether the current image is the second-in image in the video stream. If the processor 130 determines the current image is the second-in image in the video stream, it means that the processor 130 detects the moving objects for the first time and generates the frames for the first time. Therefore, in step S507, the processor 130 generates the object numbers of each of the observed objects and assigns the object numbers to each of the current frames of the current image. The processor 130 records each of the current frames and the corresponding object numbers in the storage device 120. Afterwards, in step S510, the processor 130 updates the previous image in the storage device to the current image, namely, storing the second-in image as the previous image. It is assumed that the current image is the second-in image in the video stream. Table 1 is an example showing the processor 130 recording the frames in the second-in image and the corresponding object numbers.

TABLE 1

Second-in image frame_2

| Object number | Frame | |
|---|---|---|
| ID1 | first set of coordinates of each vertex of a first frame | first central point coordinates |
| ID2 | second set of coordinates of each vertex of a second frame | second central point coordinates |
| ID3 | third set of coordinates of each vertex of a third frame | third central point coordinates |

In the example of Table 1, the processor 130 respectively generates object numbers ID1, ID2, ID3 of the three observed objects and assigns the object numbers ID1, ID2, ID3 to three frames generated after the image processing. By recording the vertex coordinates of each frame (e.g., vertex coordinates of the rectangular frames) and the central point coordinates in a frame list as shown in Table 1, the current frames on the current image are stored. However, Table 1 is merely illustrative and is not meant to limit the disclosure.

On the other hand, if the processor 130 determines the current image is not the second-in image in the video stream, it means that the current image, which is currently being analyzed, is an image subsequent to the second image, and the processor 130 has generated and recorded the previous frames of the previous image, and has assigned the object numbers to the previous frames of the previous image. Accordingly, in step S508, the processor 130 analyzes the position projecting relationship between the current frames in the current image and the previous frames in the previous image to assign the object numbers of the observed objects to the current frames of the current image. Specifically, the processor 130 determines whether the current frames correspond to the previous frames in a one-to-one manner, and assigns the object numbers corresponding to the previous frames to the corresponding current frames according to the association between the current frames and the previous frames.

It is noted that in the process of detecting the moving objects through the image subtraction method, it is likely that the two observed objects may be identified as the same moving object due to proximity to each other, and thus only one frame is generated. In the disclosure, a frame generated by identifying two observed objects together as the same moving object is referred to as an overlapping frame. The generation of an overlapping frame causes confusion in links among the observed objects, the frames, and the object numbers. Therefore, according to the position projecting relationship between the previous frames and the current frames, the processor 130 determines whether an overlapping frame corresponding to two of the previous frames is present in the current image.

Next, in step S509, if two of the previous frames correspond to a single overlapping frame in the current image, the processor 130 modifies the overlapping frame in the current image, generates a first modified frame and a second modified frame, and re-assigns the object numbers to the first modified frame and the second modified frame. After removing the overlapping frame and generating the first modified frame and the second modified frame, the processor 130 records each of the current frames (including the first modified frame and the second modified frame) and the corresponding object numbers in the storage device 120. In step S510, the processor 130 updates the previous image in the storage device to the current image. In step S511, the processor 130 outputs a result.

By repetitively executing the process in FIG. 5, each of the images in the video stream can be analyzed as the current image, and the linking relationship between the frames and the object numbers of each of the images is also recorded. Accordingly, through extracting a plurality of frames corresponding to the same object number, movement information and position information of the observed objects can be obtained from the positions of the extracted frames.

It is noted that since the number of the observed objects does not change, the number of the moving objects detected through image analysis should be identical to the number of the observed objects. However, in the process of monitoring the observed objects through the video stream, the observed objects that are moving may be completely blocked or may abruptly appear due to presence of stationary objects, such that the number of the detected moving objects may be inconsistent with the number of the observed objects. Alternatively, in the process of obtaining the frames, a moving object may be erroneously identified as two moving objects due to noise disturbance or formal changes in the observed objects, such that the number of the detected moving objects may be inconsistent with the number of the observed objects. Alternatively, when the previous image and the current image are used to detect the moving objects, it is likely that the two observed objects may be identified as the same moving object due to proximity to each other, such that the number of the detected moving objects may be inconsistent with the number of the observed objects. The foregoing phenomena may trigger erroneous recognition and tracking results.

To accommodate the foregoing phenomena, the embodiments of the disclosure further disclose an improved process to prevent cases where the moving objects corresponding to the same observed objects do not correspond to the same object numbers. In an embodiment, the processor 130 calculates a plurality of current object central points of the current frames of the current image and calculates a plurality of previous object central points of the previous frames of the previous image. Then, according to the current object central points and the positions of the previous frames in the previous image and according to the previous object central points and the positions of the current frames in the current image, the processor 130 determines whether the current frames correspond to the previous frames in a one-to-one manner. If the current frames correspond to the previous frames in a one-to-one manner, the processor 130 directly assigns the object numbers to the current frames to establish the linking relationship between the current frames and the observed objects. If the current frames do not correspond to the previous frames in a one-to-one manner, the processor 130 merges or divides part of the current frames or executes a lost object recognition mechanism.

Figure 6A:
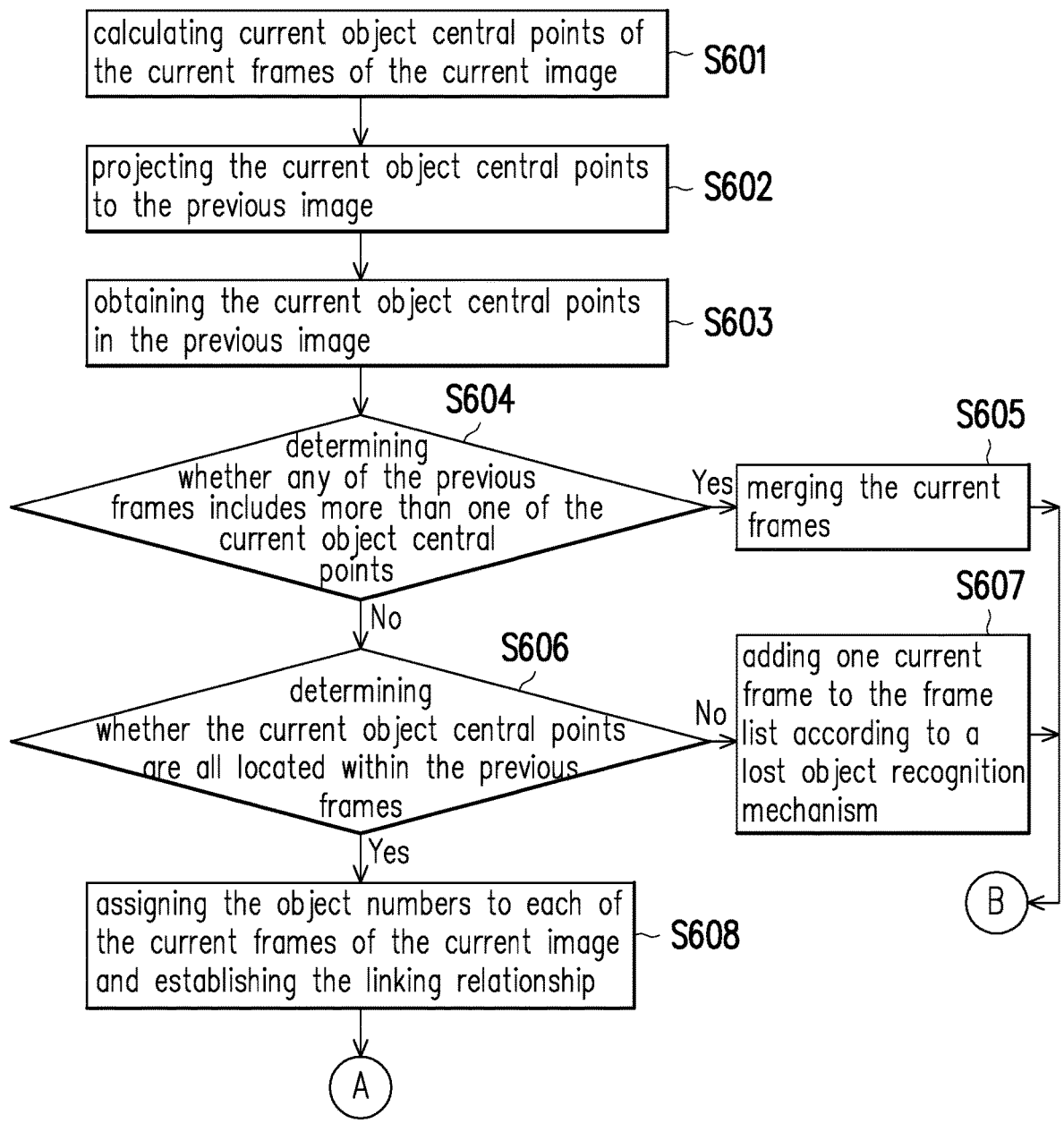

Embodiments will be provided below with reference to the components of the image-based object tracking system 10 of FIG. 1 to describe detailed steps of the object tracking method executed by the image-based object tracking system 10. FIG. 6A and FIG. 6B are detailed flowcharts illustrating the establishment of the linking relationship between the frames in the current image and the observed objects according to an embodiment of the disclosure. FIG. 6A and FIG. 6B illustrate implementation details of step S508 in the embodiment of FIG. 5.

First, in step S601, the processor 130 calculates current object central points of the current frames of the current image. In an embodiment, it is assumed that the current frames are rectangular, and then the current object central point may be an intersection point of two diagonals of the current frame. In step S602, the processor 130 projects the current object central points to the previous image. In step S603, the processor 130 obtains the current object central points in the previous image. The processor 130 determines whether the current object central points fall within ranges bound by the previous frames according to coordinates of the current object central points. In step S604, the processor 130 determines whether any of the previous frames includes more than one of the current object central points.

If the processor 130 determines the previous frames includes more than one of the current object central points, it means that the case where one single observed object is erroneously identified as two moving objects occurs. Therefore, in step S605, the processor 130 merges the current frames of the current image. Specifically, if more than one of the current object central points is located within one of the previous frames (namely, the current object central points of a first current frame and a second current frame are located within one of the previous frames), the processor 130 merges the first current frame and the second current frame, and generates a merged frame. Then, in step S615, the processor 130 assigns the object number of the previous frame including the more than one of the current object central points to the merged frame and assigns the other object numbers to the other corresponding current frames.

Figure 7A:
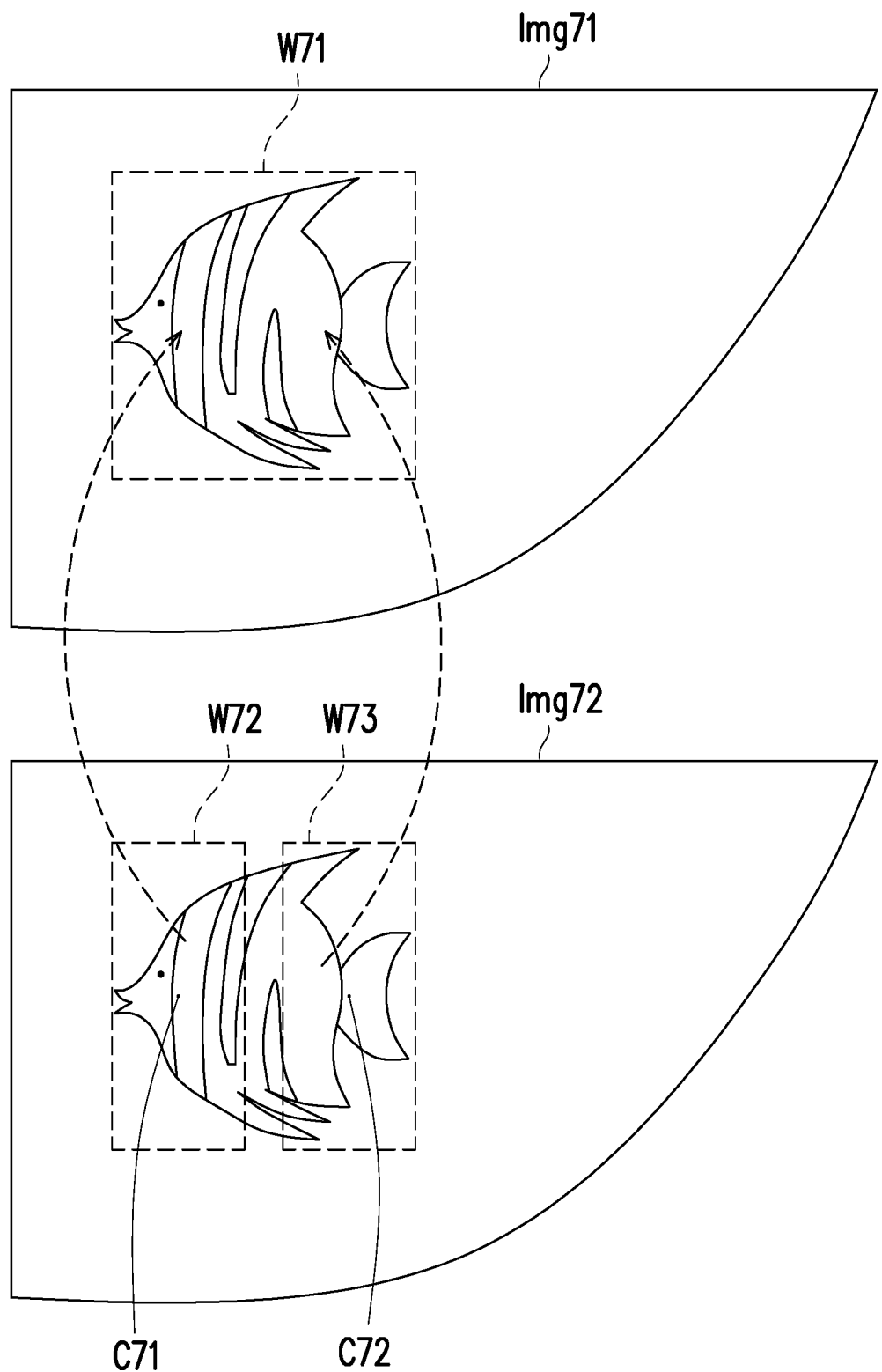
FIG. 7A to FIG. 7E illustrate examples of a current image and a previous image according to an embodiment of the disclosure.

For example, referring to FIG. 7A, after detecting the moving objects based on a previous image Img71 and a current image Img72, the processor 130 generates a current frame W72 and a current frame W73 of the current image Img72. The processor 130 projects current object central points C71, C72 of the current frames W72, W73 respectively to the previous image Img71. In the example of FIG. 7A, the processor 130 determines that the current object central points C71, C72 are located within a same previous frame W71, so the processor 130 merges the current frames W72, W73 to generate a merged frame corresponding to one single observed object. If the previous frame W71 corresponds to an object number 'fish_id1', the processor 130 assigns the object number 'fish_id1' to the merged frame. In an embodiment, the processor 130 generates a new merged frame based on four pairs of vertex coordinates of the current frames W72, W73.

Referring back to the flowchart in FIG. 6A, if the processor 130 determines the previous frames do not include more than one of the current object central points, it means that the case where one single observed object is erroneously identified as two moving objects does not occur. Next, in step S606, the processor 130 determines whether the current object central points are all located within the previous frames. If the processor 130 determines the current object central points are all located within the previous frames, it means that new moving objects that are not found in the previous image appear in the current image. For example, when a fish in the aquarium swims out from a stationary rock, a moving object that is not found in the previous image is detected on the current image. Therefore, if the processor 130 determines the current object central points are all located within the previous frames, proceeding to step S607, the processor 130 adds one current frame to the frame list of the current image according to a lost object recognition mechanism. In other words, if each of the previous frames does not include more than one of the current object central points and the current object central points are not all located within the previous frames, the processor 130 adds the new current frame corresponding to the current object central point that is not located within the previous frames to the frame list according to the lost object recognition mechanism. Then, in step S615, the processor 130 assigns the object number to the new current frame and assigns the object numbers to the corresponding current frames.

Specifically, in an embodiment, the lost object recognition mechanism includes a lost object recording step and a lost object searching step. In step S607, the processor 130 executes the lost object searching step of the lost object recognition mechanism to search in a lost object list. The lost object list records an appearance feature of at least one lost object and an object number corresponding to the lost object. When the processor 130 determines that one current object central point is not located within the previous frames, by comparing the object appearance feature of the lost object, the processor 130 creates a new current frame and finds the corresponding object number in the lost object list. The creation of the lost object list in the lost object recognition mechanism will be described in a subsequent process in FIG. 6B.

Figure 7B:
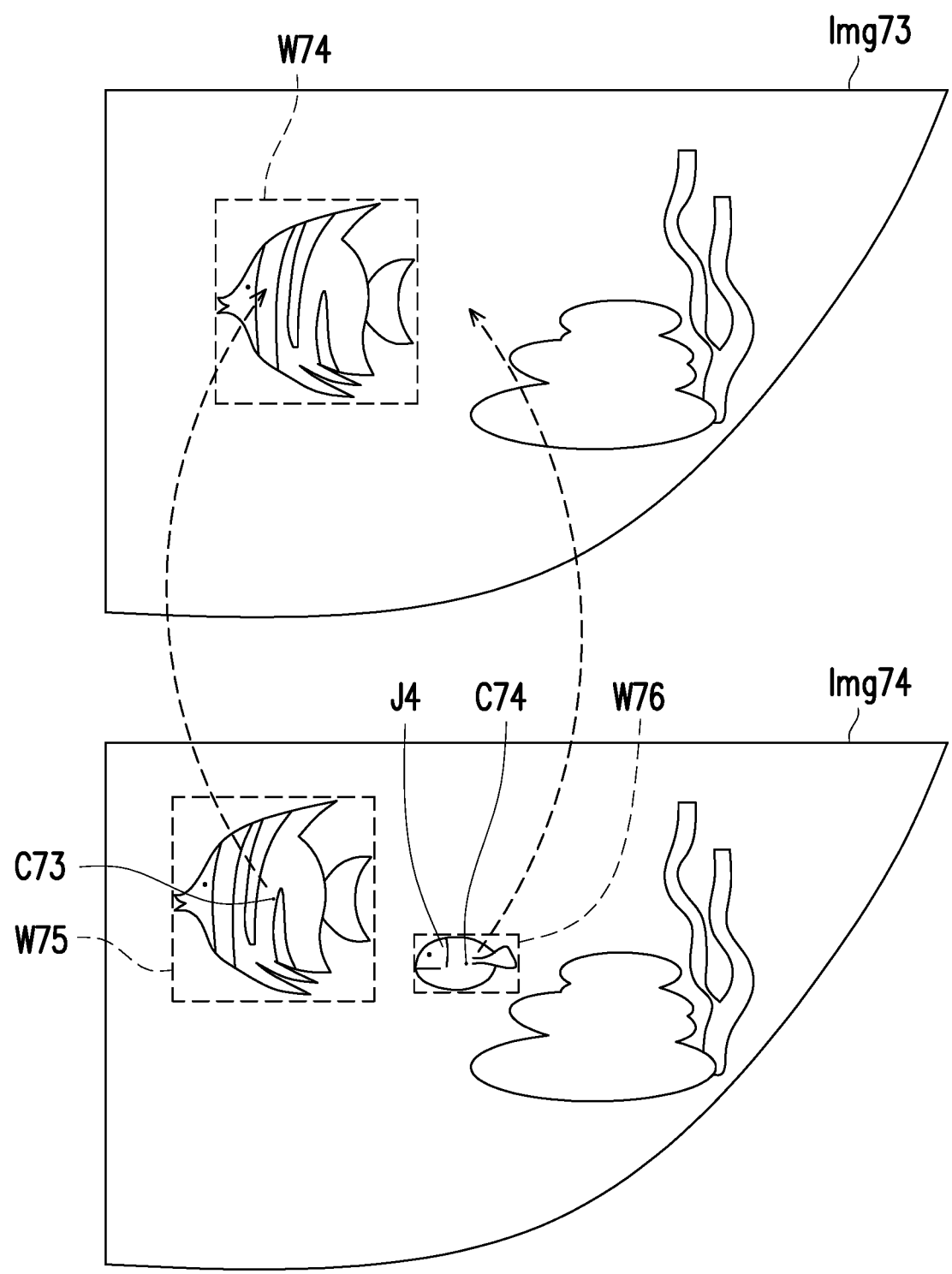

For example, referring to FIG. 7B, after detecting the moving objects based on a previous image Img73 and a current image Img74, the processor 130 generates a current frame W75 and a current frame W76 of the current image Img74. The processor 130 projects current object central points C73, C74 of the current frames W75, W76 respectively to the previous image Img73. In the example of FIG. 7B, the processor 130 determines that the current object central point C74 is not located within any one of the previous frames, the processor 130 adds a new current frame W76 corresponding to the current object central point C74 to a frame list of the current image Img74 according to the lost object recognition mechanism, and the processor 130 assigns the object numbers to each of the current frames including the new current frame W76. For example, the processor 130 looks up in a lost object list as shown in Table 2 and compares the object appearance feature of a moving object J4 with all object appearance features in the lost object list. Once it is found that the object appearance feature of the moving object J4 is similar to an object appearance feature (A) in the lost object list, the processor 130 obtains a corresponding lost object number (e.g., object number 'fish_id9') according to the search result and adds the lost object number (e.g., the object number 'fish_id9') and the frame W76 to the frame list of the current image Img74.

TABLE 2

Lost object list

| Lost object number | Object appearance feature |
|---|---|
| fish_id9 | Pattern feature, contour feature (A) |
| fish_id13 | Pattern feature, contour feature (B) |

Next, if the processor 130 determines the current object central points are all located within the previous frames, proceeding to step S608, the processor 130 assigns the object numbers to each of the current frames of the current image and establishes the linking relationship. Specifically, the processor 130 assigns the object numbers to each of the current frames according to the association between the previous frames and the current frames. Since the processor 130 has obtained the current object central points located in the previous image, the processor 130 directly assigns the object numbers of the previous frames to the corresponding current frames.

Next, referring to FIG. 6B, in step S609, the processor 130 calculates previous object central points of the previous frames of the previous image. In step S610, the processor 130 projects the previous object central points of the previous frames to the current image. In step S611, the processor 130 obtains the previous object central points in the current images. In contrast to steps S601 to S603, where the current object central points in the subsequent image are projected to the prior image, in steps S609 to S611, the previous object central points in the prior image are projected to the subsequent image.

In step S612, the processor 130 determines whether the previous object central points are all located within the current frames. If the processor 130 determines the previous object central points are not all located within the current frames, it means that the moving objects that are found in the previous image disappear in the current image. For example, when a fish in the aquarium swims behind a stationary rock and is blocked by the stationary rock, the moving object found in the previous image disappears in the current image. Therefore, if the processor 130 determines the previous object central points are not all located within the current frames, proceeding to step S613, the processor 130 records a lost object number and an object appearance feature according to the lost object recognition mechanism.

Specifically, in an embodiment, the lost object recognition mechanism includes a lost object recording step and a lost object searching step. In step S613, the processor 130 executes the lost object recording step to add a lost object to the lost object list by recording the appearance feature of the lost object and the object number corresponding to the lost object. If the previous object central points are not all located within the current frames, the processor 130 records the lost object number and the object appearance feature corresponding to the previous object central point that is not located within the current frames according to the lost object recognition mechanism. Therefore, in step S615, the processor 130 assigns the object numbers excluding the lost object number to each of the current frames.

Figure 7C:
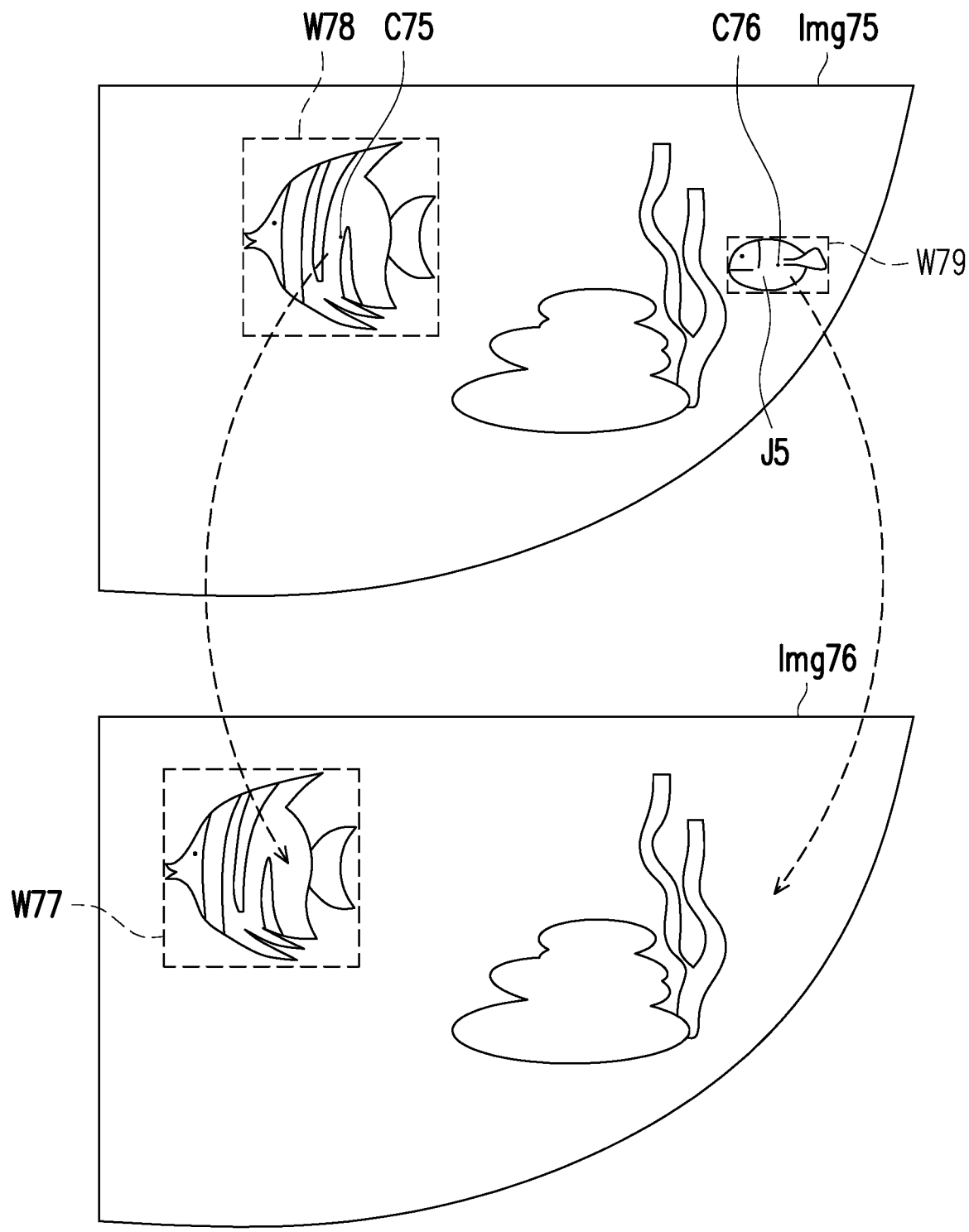

For example, referring to FIG. 7C, after detecting the moving objects based on a previous image Img75 and a current age Img76, the processor 130 generates a current frame W77 of the current image Img76. The processor 130 projects a previous object central point C75 of a previous frame W78 and a previous object central point C76 of a previous frame W79 respectively to the current image Img76. In the example of FIG. 7C, the processor 130 determines that the previous object central point C76 is not located within any one of the current frames, so the processor 130 records a lost object number and an object appearance feature corresponding to a moving object J5 in the lost object list. An example of the lost object list is as shown in Table 2.

Figure 7D:
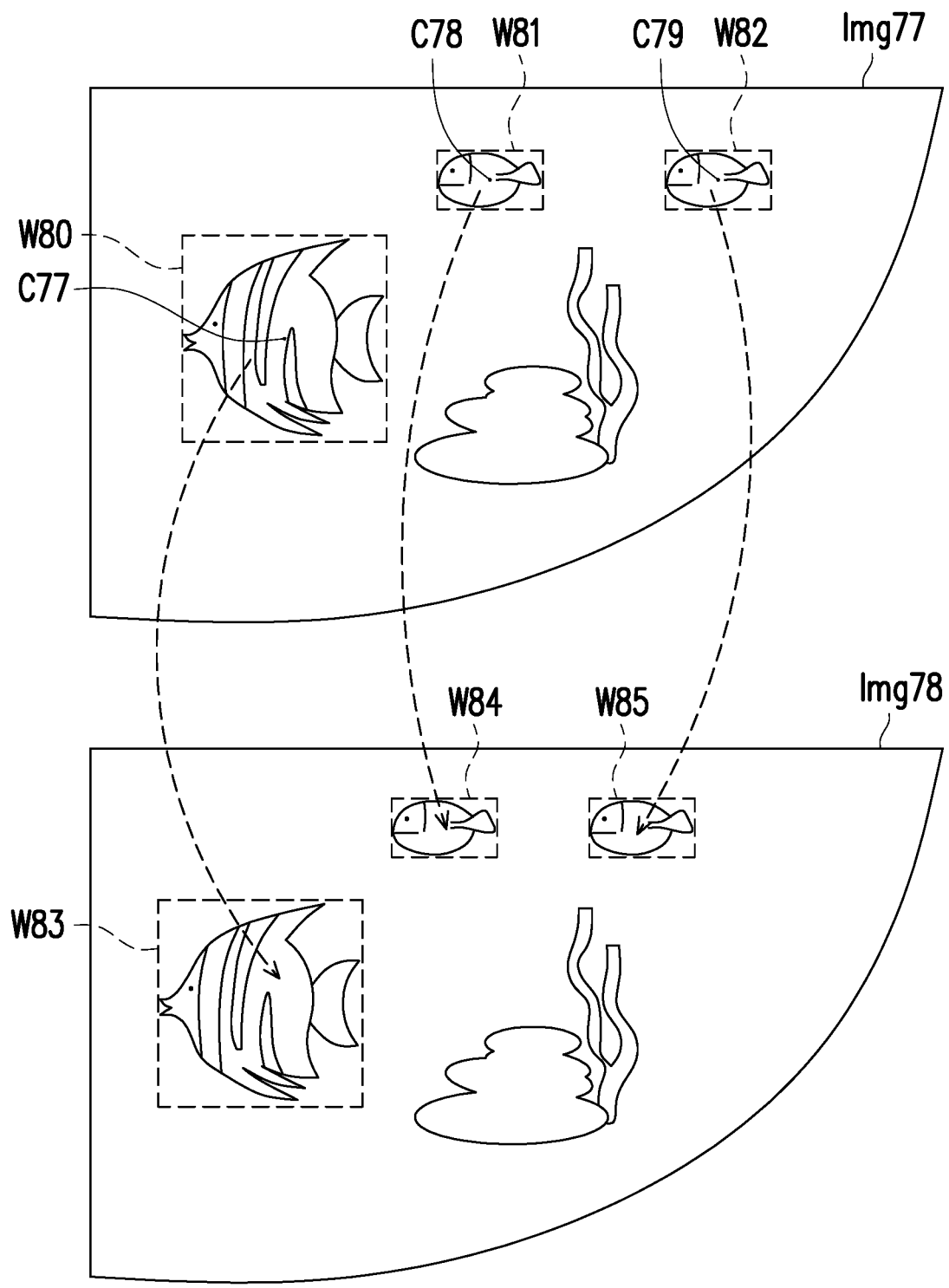

If the processor 130 determines the previous object central points are all located within the current frames, proceeding to step S614, the processor 130 determines whether more than one of the previous object central points is present in any of the current frames. Based on the determination in step S614, the processor 130 detects whether an overlapping frame is present among the current frames. If the processor 130 determines no more than one of the previous object central points is present in any of the current frames, it means that the current frames in the current image correspond to the previous frames in the previous image in a one-to-one manner. As shown in FIG. 7D, after detecting the moving objects based on a previous image Img77 and a current image Img78, the processor 130 generates current frames W83, W84, W85 of the current image Img78. The processor 130 determines that previous object central points C77, C78, C79 are respectively located within the corresponding current frames W83, W84, W85, and none of the current frames includes more than one of the previous object central points. Therefore, the processor 130 sequentially assigns the object numbers of previous frames W80, W81, W82 respectively to the current frames W83, W84, W85.

On the other hand, if the determination in step S614 is affirmative, it means that an overlapping frame is found in the current image. Therefore, if more than one of the previous object central points is located within the overlapping frame among the current frames, in step S509, the processor 130 modifies the overlapping frame in the current image and generates a first modified frame and a second modified frame and re-assigns the object numbers to the first modified frame and the second modified frame.

Figure 7E:
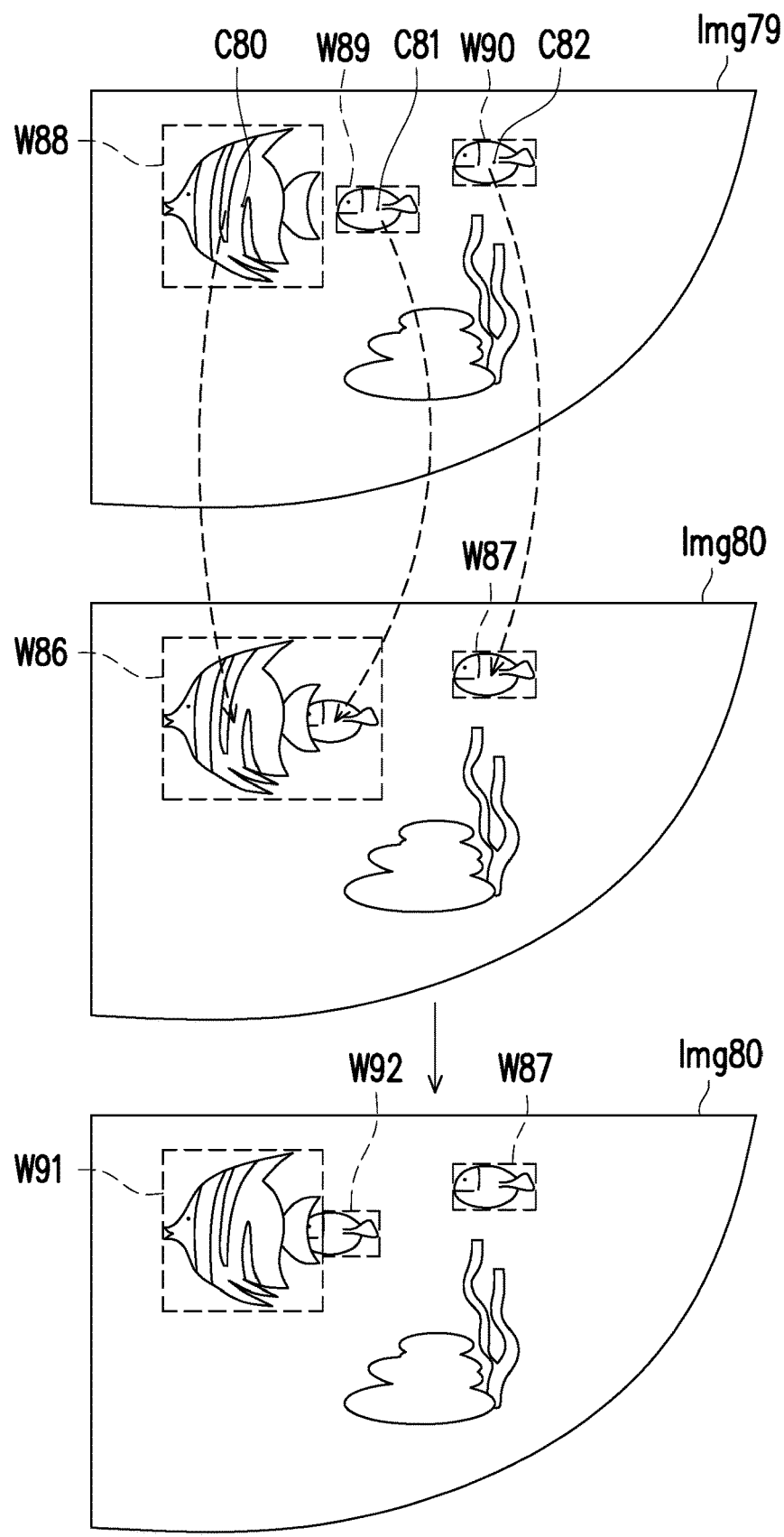

For example, referring to FIG. 7E, after detecting the moving objects based on a previous image Img79 and a current image Img80, the processor 130 generates current frames W86, W87 of the current image Img80. The processor 130 projects previous object central points C80, C81, C82 respectively to the current image Img80. In the example of FIG. 7E, the processor 130 determines that the previous object central points C80, C81 are located within a same current frame W86, the processor 130 modifies the overlapping frame (i.e., the current frame W86) of the current image Img80 and generates a first modified frame W91 and a second modified frame W92. In an embodiment, the processor 130 divides the overlapping frame W86 into the first modified frame W91 and the second modified frame W92 based on positions and sizes of previous frames W88 and W89. In other words, the processor 130 removes the overlapping frame from the frame list and adds the two modified frames to the frame list. Moreover, if the previous frame W88 corresponds to an object number 'fish_id2', the processor 130 assigns the object number 'fish_id2' to the first modified frame W91. If the previous frame W89 corresponds to an object number 'fish_id3', the processor 130 assigns the object number 'fish_id3' to the second modified frame W92. Accordingly, based on the processes in FIG. 6A and FIG. 6B, the linking relationship between the current frames in each of the images and the observed objects can be correctly established.

The embodiments of the disclosure further provide a non-transitory computer-readable medium. The computer-readable medium stores a plurality of program code segments, and the program code segments accomplish the steps in the foregoing image-based object tracking method after being loaded to and executed by the processor 130 of the image-based object tracking system 10.

In summary of the above, in the embodiments of the disclosure, the frames configured to mark the moving objects in the images are generated based on image processing. By analyzing the position projecting relationship between the current frames in the current image and the previous frames in the previous image, the linking relationship between the current frames in the current image and the observed objects is established. By sequentially processing the images of the video stream and constantly analyzing the position projecting relationship between the frames in two consecutive images, the linking relationship between the frames in the images and the observed objects can be correctly established. Accordingly, based on the frame positions in the images, the movement statuses and positions of the observed objects in the enclosed space can be accurately tracked, which facilitates analysis on mobility or other characteristics of the observed objects according to the tracking results and facilitates embedding object label information in the image of the video stream by using the tracking results. Moreover, based on the method of tracking through analyzing the correspondence of the frames in the embodiments, more accurate tracking results can be provided for the observed objects having greater formal changes.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image-based object tracking method for an object tracking system, the method comprising:
   receiving a video stream comprising a plurality of images, wherein the video stream is generated through photographing an enclosed space by an image capturing device, and a moving range of a plurality of observed objects is limited to the enclosed space;
   detecting a plurality of moving objects from the video stream, and generating frames associated with each of the moving objects for the images, wherein the images comprise a current image and a previous image;
   establishing linking relationship between a plurality of current frames in the current image and the observed objects by analyzing position projecting relationship between the current frames in the current image and a plurality of previous frames in the previous image; and
   tracking the observed objects in the enclosed space according to the established linking relationship,
   wherein the step of establishing linking relationship between the current frames in the current image and the observed objects by analyzing the position projecting relationship between the current frames in the current image and the previous frames in the previous image comprises:
   determining whether the current frames correspond to the previous frames by comparing a plurality of current object central points of the current frames and positions of the previous frames in the previous image and by comparing a plurality of previous object central points of the previous frames and positions of the current frames in the current image.

2. The image-based object tracking method according to claim 1, further comprising: generating a plurality of object numbers of the observed objects according to the analysis of the position projecting relationship, wherein each of the observed objects corresponds to one of the object numbers, and the linking relationship between the current frames in the current image and the observed objects is established based on the object numbers.

3. The image-based object tracking method according to claim 1, wherein the step of establishing the linking relationship between the current frames in the current image and the observed objects by analyzing the position projecting relationship between the current frames in the current image and the previous frames in the previous image comprises:
   analyzing the position projecting relationship between the current frames in the current image and the previous frames in the previous image to assign a plurality of object numbers of the observed objects to the current frames of the current image; and
   modifying an overlapping frame to generate a first modified frame and a second modified frame and re-assigning the object numbers to the first modified frame and the second modified frame, if two of the previous frames correspond to the overlapping frame of the current image.

4. The image-based object tracking method according to claim 3, wherein the step of analyzing the position projecting relationship between the current frames in the current image and the previous frames in the previous image to assign the object numbers of the observed objects to the current frames of the current image comprises:
   calculating the current object central points of the current frames of the current image and calculating the previous object central points of the previous frames of the previous image.

5. The image-based object tracking method according to claim 4, wherein the step of determining whether the current frames correspond to the previous frames by comparing the current object central points and the positions of the previous frames in the previous image and by comparing the previous object central points and the positions of the current frames in the current image comprises:
   projecting the current object central points to the previous image;
   determining whether any of the previous frames comprises more than one of the current object central points; and
   determining whether the current object central points are all located within the previous frames.

6. The image-based object tracking method according to claim 5, wherein the step of analyzing the position projecting relationship between the current frames in the current image and the previous frames in the previous image to assign the object numbers of the observed objects to the current frames of the current image comprises:
   merging a first current frame and a second current frame to generate a merged frame, and assigning the object numbers to the current frames comprising the merged frame, if more than one of the current object central points is located within one of the previous frames; and
   adding a new current frame corresponding to a current object central point, which is not located within the previous frames, to a frame list and assigning the object numbers to the current frames comprising the new current frame according to a lost object recognition mechanism, if each of the previous frames does not comprise more than one of the current object central points and the current object central points are not all located within the previous frames.

7. The image-based object tracking method according to claim 4, wherein the step of determining whether the current frames correspond to the previous frames according to the current object central points and the positions of the previous frames in the previous image and according to the previous object central points and the positions of the current frames in the current image comprises:
projecting the previous object central points to the current image;
determining whether the previous object central points are all located within the current frames; and
determining whether any of the current frames comprises more than one of the previous object central points.

8. The image-based object tracking method according to claim 7, wherein the step of analyzing the position projecting relationship between the current frames in the current image and the previous frames in the previous image to assign the object numbers of the observed objects to the current frames of the current image further comprises:
recording a lost object number and an object appearance feature corresponding to a previous object central point, which is not located within the current frames, according to a lost object recognition mechanism and assigning the object numbers excluding the lost object number to the current frames, if the previous object central points are not all located within the current frames.

9. The image-based object tracking method according to claim 7, wherein the step of modifying the overlapping frame to generate the first modified frame and the second modified frame and re-assigning the object numbers to the first modified frame and the second modified frame if two of the previous frames correspond to the overlapping frame of the current image comprises:
modifying the overlapping frame of the current image to generate the first modified frame and the second modified frame and re-assigning the object numbers to the first modified frame and the second modified frame, if more than one of the previous object central points is located within the overlapping frame among the current frames.

10. An image-based object tracking system comprising:
an image capturing device configured to photograph an enclosed space and generate a video stream, wherein a moving range of a plurality of observed objects is limited to the enclosed space;
a storage device configured to store data; and
a processor coupled to the image capturing device and the storage device and configured to:
receive a video stream comprising a plurality of images;
detect a plurality of moving objects from the video stream, and generate frames associated with each of the moving objects, wherein the images comprise a current image and a previous image;
establish linking relationship between current frames in the current image and the observed objects by analyzing position projecting relationship between the current frames in the current image and previous frames in the previous image; and
track the observed objects in the enclosed space according to the established linking relationship,
wherein the processor determines whether the current frames correspond to the previous frames by comparing a plurality of current object central points of the current frames and positions of the previous frames in the previous image and by comparing a plurality of previous object central points of the previous frames and positions of the current frames in the current image.

11. The image-based object tracking system according to claim 10, wherein the processor generates a plurality of object numbers of the observed objects according to the analysis of the position projecting relationship, wherein each of the observed objects corresponds to one of the object numbers, and the linking relationship between the current frames in the current image and the observed objects is established based on the object numbers.

12. The image-based object tracking system according to claim 10, wherein the processor analyzes the position projecting relationship between the current frames in the current image and the previous frames in the previous image to assign a plurality of object numbers of the observed objects to the current frames of the current image,
wherein the processor modifies an overlapping frame to generate a first modified frame and a second modified frame and re-assigns the object numbers to the first modified frame and the second modified frame, if two of the previous frames correspond to the overlapping frame of the current image.

13. The image-based object tracking system according to claim 12, wherein the processor calculates the current object central points of the current frames of the current image and calculates the previous object central points of the previous frames of the previous image.

14. The image-based object tracking system according to claim 13, wherein the processor projects the current object central points to the previous image, determines whether any of the previous frames comprises more than one of the current object central points, and determines whether the current object central points are all located within the previous frames.

15. The image-based object tracking system according to claim 14, wherein the processor merges a first current frame and a second current frame to generate a merged frame, and assigns the object numbers to the current frames comprising the merged frame, if more than one of the current object central points is located within one of the previous frames,
wherein the processor adds a new current frame corresponding to a current object central point that is not located within the previous frames to a frame list and assigns the object numbers to the current frames comprising the new current frame according to a lost object recognition mechanism, if each of the previous frames does not comprise more than one of the current object central points and the current object central points are not all located within the previous frames.

16. The image-based object tracking system according to claim 14, wherein the processor projects the previous object central points to the current image, determines whether the previous object central points are all located within the current frames, and determines whether any of the current frames comprises more than one of the previous object central points.

17. The image-based object tracking system according to claim 16, wherein the processor records a lost object number and an object appearance feature corresponding to a previous object central point that is not located within the current frames according to a lost object recognition mechanism and assigns the object numbers excluding the lost object number to the current frames, if the previous object central points are not all located within the current frames.

18. The image-based object tracking system according to claim 16, wherein the processor modifies the overlapping frame of the current image to generate the first modified frame and the second modified frame and re-assigns object numbers to the first modified frame and the second modified frame, if more than one of the previous object central points is located within the overlapping frame among the current frames.

19. A non-transitory computer-readable recording medium, recording computer programs to be loaded into a processor of an image-based object tracking system to execute steps of:

receiving a video stream comprising a plurality of images, wherein the video stream is generated through photographing an enclosed space by an image capturing device, and a moving range of a plurality of observed objects is limited to the enclosed space;

detecting a plurality of moving objects from the video stream, and generating frames associated with each of the moving objects, wherein the images comprise a current image and a previous image;

establishing linking relationship between current frames in the current image and the observed objects by analyzing position projecting relationship between the current frames in the current image and previous frames in the previous image; and tracking the observed objects in the enclosed space according to the established linking relationship, wherein the step of establishing linking relationship between the current frames in the current image and the observed objects by analyzing the position projecting relationship between the current frames in the current image and the previous frames in the previous image comprises:

determining whether the current frames correspond to the previous frames by comparing a plurality of current object central points of the current frames and positions of the previous frames in the previous image and by comparing a plurality of previous object central points of the previous frames and positions of the current frames in the current image.

* * * * *